Oct. 31, 1950     H. H. VALPEY     2,528,325
TRANSCRIBING DEVICE
Filed Oct. 6, 1945     2 Sheets-Sheet 1
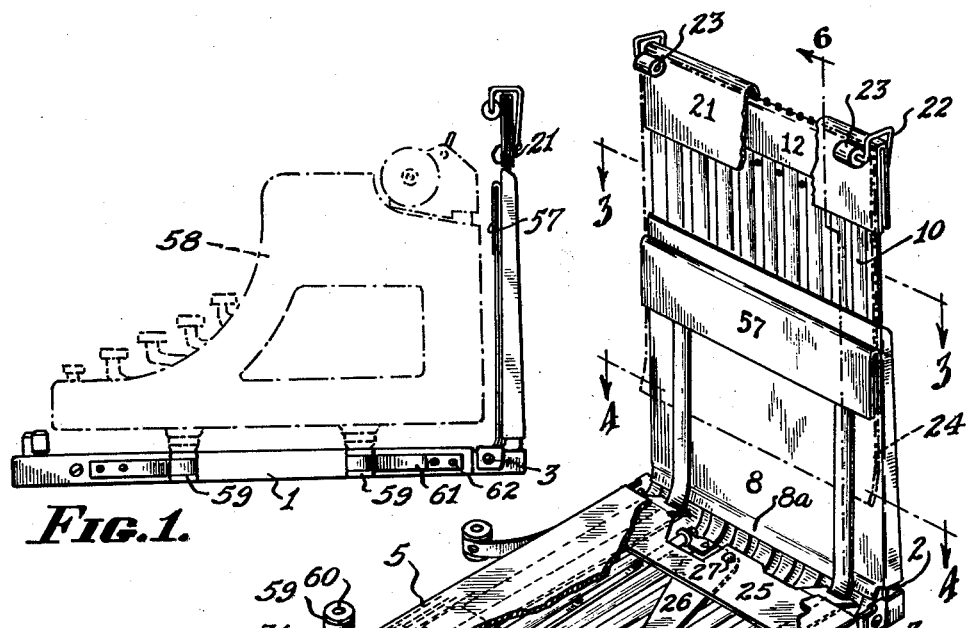
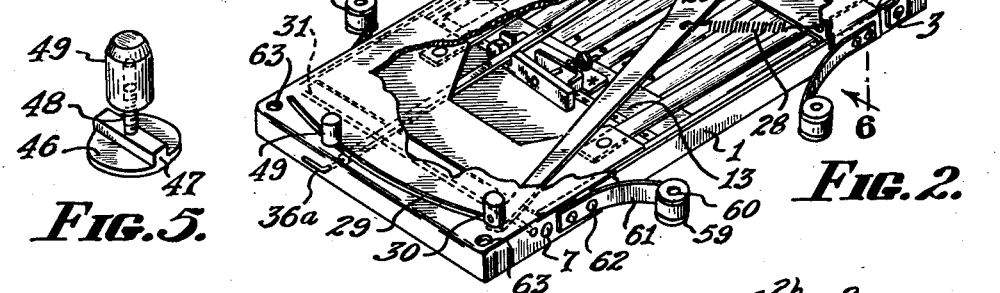
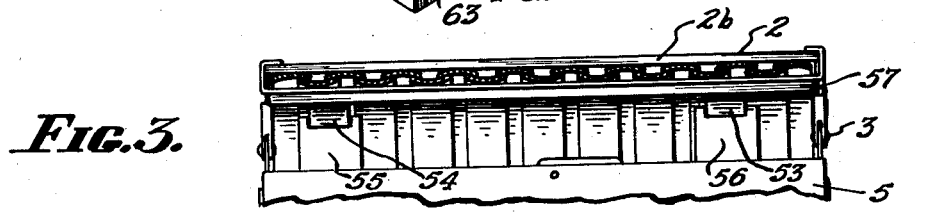
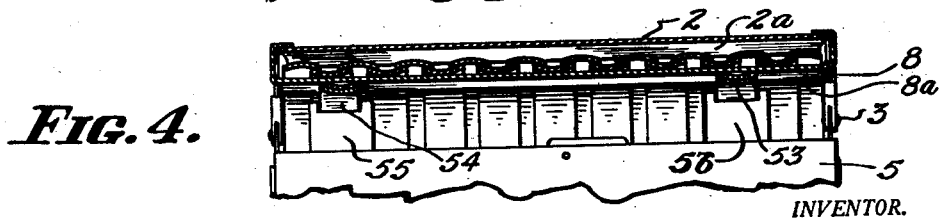
INVENTOR.
HENRY H. VALPEY.
BY Allen & Allen
ATTORNEYS.

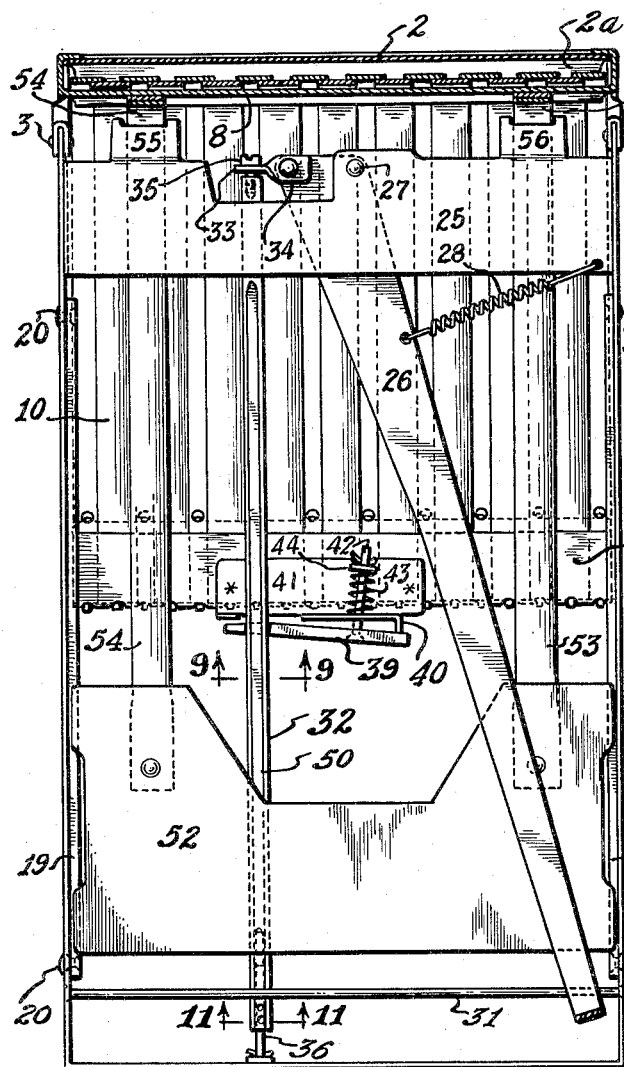
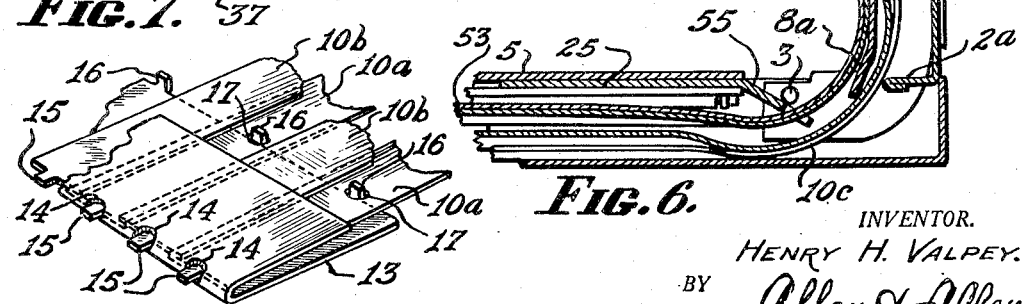

Patented Oct. 31, 1950

2,528,325

UNITED STATES PATENT OFFICE 2,528,325

TRANSCRIBING DEVICE

Henry H. Valpey, Cincinnati, Ohio

Application October 6, 1945, Serial No. 620,705

2 Claims. (Cl. 74—501)

My invention relates to mechanisms for presenting to the typist stenographic notes for transcription or written or printed matter for copying, in a position for easy observation and line-by-line where that is desired.

It is an object of my invention to provide improvements in such devices. An important one of these improvements lies in the provision of a mechanism which may be located partly beneath and partly behind the typewriter so that the controls for the mechanism are readily accessible to the operator at a position adjacent the spacer bar, while the copy is presented in a position just above the platen. Thus the operator not only need not reach to the side to operate the device, but need not be continuously glancing to the side to see the copy. The copy is brought closer to the platen and in the same general line of vision, so that eye strain is diminished and the operator's efficiency increased.

It is an object of my invention to provide a mechanism which for storage or shipment may be folded into a compact, flat form, so that it may easily be kept in a shallow desk drawer. At the same time, it is an object of my invention to provide this folding function while at the same time keeping all of the parts of the mechanism in operative relationship.

A very important object of my invention lies in the provision of a structure which may be permanently mounted with the typewriter as aforesaid, and which has a telescopic, upwardly extending portion of no greater height (when lowered) than about the height of the average typewriter. Thus the typewriter and my structure may be closed up together in the usual folding typewriter desk.

Another object of my invention, in view of the above, is the provision of a structure which may be fastened in place, and thus is not subject to shock, vibration and accidental displacement due to the operation of the control elements.

It is an object of my invention to provide a structure of this class in which the clutch, adjustment and moving devices are confined to the bottom or base portion, and hence to provide a structure in which the necessary movement of the upper parts of the device is accomplished through the employment of flexible motion transmitting means. By the same token, I have provided a structure in which the upwardly extending portion which holds and displays the copy may be operated in some position other than the truly vertical where any particular circumstances of use demand such operation.

These and other objects of my invention which will be set forth hereinafter or will be apparent to one skilled in the art upon reading these specifications, I accomplish by that structure and arrangement of parts of which I shall now describe an exemplary embodiment. Reference is made to the accompanying drawings wherein:

Figure 1 is a side elevation of my structure indicating its preferred relationship to a typewriter, the latter instrumentality being indicated in dotted lines.

Figure 2 is a perspective view of my erected structure with certain parts broken away to show interior construction.

Figure 3 is a sectional view taken along the line 3—3 of Figure 2.

Figure 4 is a sectional view taken along the line 4—4 of Figure 2.

Figure 5 is a perspective view of an adjustable stop mechanism.

Figure 6 is a partial vertical section taken along the line 6—6 of Figure 2.

Figure 7 is a plan view of the bottom or base portion of my structure with the cover element removed.

Figure 8 is a partial perspective view showing the engagement of my flexible elements with an end piece.

Figures 9 and 10 are partial sectional views showing the operating rod in different positions respecting the clutch member, and are taken along the line 9—9 of Figure 7.

Figure 11 is a sectional view through the operating rod taken along the line 11—11 of Figure 7.

Briefly in the practice of my invention I provide a structure comprising a base portion to which an upright portion is hinged. The various operating mechanisms by which movement of the copy holding devices is produced are preferably located in the base portion with the manually operated elements at the front end thereof. Means is provided to hold copy in connection with an upwardly extending portion of the device, and motion is transmitted to these means by the agency of flexible members.

The flexible members which I prefer are spring metal strip or tape-like members so formed as to have an arcuate curvature in cross section (whereby a very substantial stiffness against transverse bending is imparted to the strips) but capable of being bent transversely upon the exercise of sufficient force (whereupon the strip becomes flattened and loses its arcuate cross section, being capable of rounding corners or of being coiled up, around small radii).

I prefer to support the copy holding portion of my structure by means of a plurality of these strips in alternate arrangement, the strips extending through the upper portion of my mechanism and into the lower or base portion, following an arcuate curve at the angle between the two. With this construction, the upper portion of my device may readily be swung downwardly into substantial parallelism with the base for the purpose set forth above.

Referring to Figure 2, in my exemplary embodiment I provide a base comprising a pan-like portion 1 to which an upright channel shaped member 2 is pivoted or hinged as at 3. The pan shaped base is provided with an inverted pan shaped cover 5 which is removable and may be fastened in place in any suitable way as by screws 7. The upright portion 2 has a channel shaped cover member 8 fitting over it and which also may be fastened in place in any suitable way.

A series of the arcuate metallic strips is indicated at 10 passing through the hollow upright portion 2—8 of my mechanism and into the hollow base portion 1—5. At each end the various strips are fastened together by a common member 12 or 13. A copy holding device such as will hereinafter be described is engaged with the member 12. Operating mechanism to produce movement of the assembly 10 of the strips is provided in connection with the member 13. The front lower edge of the member 8 may be rounded or bent forwardly as at 8a to provide a guide for the curved portions of the strip assembly 10 as will be seen in both Figures 2 and 6. The lower end of the rear upright member 2 may be bent inwardly as at 2a to provide a cooperating guide element (Figure 6) for the strip assembly.

As is most clearly shown in Figure 8, the metallic strip assembly 10 is made up of strips 10a with their arcuate concavities facing in one direction, and of alternate strips 10b with their arcuate concavities facing in the opposite direction. This gives a nested construction which is thin in cross section, which is capable of being bent in a curved fashion (as at 10c in Figure 6) at the angle between the base and upper portions of my device but which nevertheless is stiff enough to avoid accidental bending above the upright portion 2—8 of my structure. It will be noted in Figure 6 that the upper end of the member 2 may be bent slightly inwardly as at 2b to confine the strip assembly against the front plate 8 of the upright portion.

The strips 10a and 10b will be formed of thin gauge spring steel or other spring metal, or of plastic. I prefer where possible to avoid welding or riveting these strips, and to this end I have worked out a mode of attachment to the members 12 and 13 which is illustrated in Figure 8. Here the element 13 is shown as a piece of sheet metal bent upon itself so as to be substantially U-shaped in cross section. At the bend of the U the member is provided with a series of perforations 14, one for each strip in the assembly. The individual strips are each provided at their ends with tongues 15 which can be caused to enter these perforations as shown when the strips are moved up into the U-shaped element 13.

One of the legs of the U-shaped element is longer than the other, and this leg is provided with upstanding tongues 16 which extend through perforations 17 in one set of the strips 10a. Similar tongues may be provided to extend into perforations in the other set of strips but this is not necessary. The legs of the U-shaped member 13 are so spaced as to require a slight compression of the strips as they are inserted.

The attachment structure just described provides for the firm engagement of the strips with the end members 12 and 13, while avoiding the necessity of welding, brazing, soldering, riveting and the like. The strips are still substantially arcuate in form as engaged with the end members 12 and 13 so that these members are maintained stiffly in the plane of the adjacent portions of the tape assembly 10. Yet the structure is such that any individual tape may readily be detached from the end pieces 12 and 13 by appropriate flexing movements. This facilitates both assembly of the structure and the renewal of any strips which may become damaged.

Referring to Figure 7, along the inner edges of my lower, pan shaped base portion, I provide reinforcing strips 18 and 19 spaced slightly below the top edges of the vertical walls of the pan 1. These strips may be held in place by riveting 20, by spot welding or in other ways. The member 13 extends laterally across the pan shaped base and is designed to slide longitudinally therein either below the reinforcing strips 18, 19 or in channels formed in them. Instead of employing strips as shown, I may die-form beads or tracks in the side walls of the member 1.

As the member 13 is moved toward the rear of the base portion 1 it will now be evident that the strip assembly 10 will be moved upwardly through the upwardly extending portion 2—8 of my device with a consequent elevation of the upper member 12. A copy holding means is attached to this member. It may conveniently be formed of sheet metal as at 21, bent to a U-shaped configuration and frictionally engageable with the member 12, covering this member completely. Spring controlled clamping means 22 provided with rubber feet 23 may be employed to clamp copy to the member 21. Copy is indicated in dotted lines at 24 in Figure 2.

The base of my structure contains operating mechanism for moving the element 13 toward the rear of the base (and hence for elevating the copy holder just described) together with means for releasing the element 13 so that the copy holder may be lowered again. The broader aspects of my invention are not limited to any particular mechanism for moving the member 13 since various mechanisms may be employed. I have, however, illustrated a particular, exemplary, and an entirely satisfactory mechanism. I provide a plate 25 extending across the lower portion 1 of my base near its rear end. An operating lever 26 is pivoted to this plate as at 27, and is biased to the left by a spring 28 engaging both the lever and the plate. The end of the lever extends forwardly to the front end of my base where it may be bent upwardly so as to extend through an arcuate slot 29 in the cover 5 of my base. The lever end may at that point be provided with an operating handle 30. The forward end of the lever may rest upon and be supported by a rod 31 extending across the forward end of my base portion 1 and fastened to its walls in any suitable way as by riveting.

I provide an operating rod 32 the rear end of which has a rotatable connection with an ear 33 which is pivoted as at 34 to the lever 26 at a point spaced from the pivot point 27. The ear 33 may be attached to the rod 32 by means of a bolt 35 which will permit the required rotation of the rod 32 with respect to the ear 33, while still maintaining sufficient rigidity of connection so that movement of the pivot point 34 will result in longitudinal movement of the rod.

The forward end of the rod 32 is provided with a longitudinal perforation and is supported upon a smaller rod-like member 36, passing through and journaled in the front wall of the base member 1. Beyond this wall it is bent over as at 36a and is provided with a handle 37. The rod 36 is flattened and the bore 38 of the rod 32 is likewise non-circular as will be clearly apparent in Figure 11. Hence the rod 32 can slide longitudinally or axially with relation to the rod 36 which supports its forward end, but rotation of the rod 36 will be imparted to the rod 32.

A clutch bar 39 is mounted pivotally upon a bracket 40 which forms part of a plate 41 spot welded or otherwise attached to the end member 13 of the strip assembly. A rod 42 passes through the bracket 40 and a spring 43, engaging between the bracket and an abutment 44 on the rod 42, biases the clutch member 39 to an inclined position. The clutch member 39 is slotted as at 45 (Figure 9) to accept the rod 32 with slight clearance. It will be evident that as the lever 26 in Figure 7 is swung to the left, a longitudinal motion of the rod 32 toward the rear of the base (upwardly in the figure) will be produced. With the clutch member 39 in the inclined position as shown binding will take place, and as the rod 32 is moved to the rear its motion will be imparted to the end member 13 of the strip assembly 10 and the copy holding mechanism 21—23. When the lever 26 is released the spring 28 will draw it to the right, imparting to the rod 32 a forward movement. In this movement there will be no binding between the rod 32 and the clutch member 39 since the left hand end of this clutch member will move slightly forwardly, relieving the binding. The end member 13 may be moved rearwardly, and hence the copy holder upwardly, by a succession of these movements, as will now be understood.

In order to gauge the amount of movement of the copy holder for each actuation of the lever handle 30 I provide an adjustable stop mechanism in connection with the arcuate slot 29 (see Figures 2 and 5). This consists of a head 46 having an upstanding ledge 47 engageable in the slot and a threaded, bolt-like member 48 directed upwardly from the central portion of the head. A handle member 49 is threadedly engaged with the bolt portion 48. It will be evident that the handle member 49 may be loosened and the stop mechanism moved to any position on the slot 29 whereupon the handle 49 may be tightened. This limits the possible movement of the lever 26 since the handle 30 will meet the handle 49 at the adjusted position. Hence the lever 26 may be caused to move the copy holder upwardly by increments which are 1, 2 or more lines in depth; and the nature of my exemplary structure is such that it may be adjusted for any extent of incremental movement appropriate to copy having lines with any regular spacing.

When a page of the copy has been transcribed, it is necessary that the copy holder 21—23 be lowered again. To this end I flatten my rod 32 as indicated at 50 and 51 (Figures 7, 9 and 10). Thus by means of the rod 36 and handle 37 the operator can rotate the rod 32 to that position shown in Figure 10, where the clutch plate 39 is unable to come into clutching engagement with the rod 32. When this is done, the operator may grasp the copy holder 21—23 and lower it again to a starting position just above the top of the upward extension 2—8 of my device. The operator will then reset the clutch by means of the handle 37 (returning the rod 32 to the position shown in Figure 9) and, after having changed the copy, is in a position to repeat the operations heretofore described.

In connection with transcribing devices it is desirable to have a means for indicating the operator's place as to the lines of the copy. Such a marking device may readily be provided as shown in Figures 2, 6 and 7. It comprises a plate 52 of considerable longitudinal depth the edges of which are slidable along the tops of the track members 18 and 19 of my base member. To this plate are attached arcuate spring strips 53 and 54 which extend to the rear of the base. Grooved ears 55 and 56 on the plate 25 may serve as guides for these strips as they curve around the angle between the base and upright portions of my device. The ends of the strips extend upwardly in front of the cover part 8 of the upright portion of my device and are attached to a suitable bar 57 extending laterally across the upright portion. The stiffness of the strips serves to maintain this bar in position; but several strips may be combined to form the elements 53 and 54. The arcuate curvature of the strips making up members 53 and 54 holds the bar 57 against the upright portion of my device with slight resilient tension. This is sufficient to hold the pages of the copy without binding. The bar 57 may be moved up or down vertically by hand to whatever position is seen to be required by the operator. Also for instant inspection, it may be drawn outwardly away from the upright portion of my device and then replaced. It will be evident that this marker device will fold along with the upright portion of my structure.

When the cover portion of my base is in assembled position as shown in Figure 2, it covers the lever, the clutch and the other mechanisms outlined above. As has been indicated, the base portion 1—5 is intended to extend beneath a typewriter 58 as indicated in Figure 1. Some typewriters have leg portions of sufficient depth to permit this. Others require to be raised. This may be done in any suitable fashion; but I prefer to provide in connection with my structure certain elements which may be caused to underlie the feet of the typewriter and to which the feet of the typewriter may be attached or through which the feet of the typewriter may be attached to an underlying desk top or support. As shown in Figures 1 and 2 these elements preferably comprise rubber or other supporting means 59 of cylindrical form and perforated as at 60 for the acceptance of bolts, screws or the like. The elements 59 are attached by means of arcuate tapes of substantial length 61, to the cover member 5 of my base portion. This may be done by riveting as at 62. It will be evident from Figure 2 that the elements 59 may be moved to varying positions to underlie the feet of typewriters of different styles and designs, while maintaining their connection with my structure through the arcuate strips 61. When the elements 59 have been moved to the required positions the feet of the typewriter may be attached through them to the desk.

Needless to say, the elements 59, 60, 61 may be omitted if desired and typewriters having too little clearance for the base of my structure may be raised above the desk top in other ways. I normally provide perforations 63 through my base whereby the base itself may be attached to a desk directly by means of screws or bolts.

The body portions of my device including the base portions 1 and 5, the upright portions 2 and 8, the copy holder 21, and the bar 57 will be finished for appearance and preservation in any suitable way, for example by the use of crackle lacquer. The arcuate strips may be similarly finished if desired, but a pleasing effect is obtained by leaving them of bright metal, or by plating them with metal as may be desired to prevent rust and corrosion. The structure is foldable on the pivots 3 so as to occupy a small space for handling or storage or in initial shipment. My mechanism may be as readily used as any other in a position offside the typewriter; but its construction permits it to be used as illustrated in Figure 1 with the base of the structure extending beneath the typewriter. This is a distinct and unique advantage since it not only presents the control elements 30, 37 and 49 in a position requiring a minimum of movement on the part of the operator but also presents the copy in a position visually directly above the typewriter platen so that head movements are not required of the operator. The marker bar 57 can of course be adjusted to any desired height in relation to the height of the typewriter mechanism itself.

As indicated in Figure 1 the vertical height of my structure when the top member 21 is in its lowermost position that it may be closed up with the typewriter in a folding typewriter desk.

Modifications may be made in my invention without departing from the spirit of it. Having described my invention in an exemplary embodiment, what I claim as new and desire to secure by Letters Patent is:

1. In a structure of the class described, motion transmitting means having a property of longitudinal rigidity at bending stresses below a maximum and the property of bending around a small radius curve when said maximum is exceeded, said means comprising a plurality of spring strips arcuate in cross section but capable of flattening upon being bent, said strips being arranged in alternate opposition to form a composite flat element, and means engaging the strips at their ends.

2. In a structure of the class described, motion transmitting means having a property of longitudinal rigidity at bending stresses below a maximum and the property of bending around a small radius curve when said maximum is exceeded, said means comprising a plurality of spring strips arcuate in cross section but capable of flattening upon being bent, said strips being arranged in alternate opposition to form a composite flat element, and means engaging the strips at their ends, said last mentioned means comprising U-shaped elements embracing the ends of said strips, each U-shaped element having at its curved portions perforations to accept tongues on the ends of said strips, one of the legs of each U-shaped element extending beyond the other and provided with teeth extending transversely of said strips and engaging in perforations in some at least of said strips.

HENRY H. VALPEY.

REFERENCES CITED

The following references are of record in the file of this patent:

UNITED STATES PATENTS

| Number | Name | Date |
| --- | --- | --- |
| 1,742,389 | Grabler | Jan. 7, 1930 |
| 1,746,732 | Knutsson | Feb. 11, 1930 |
| 1,969,916 | Van Alstyne | Aug. 14, 1934 |
| 1,985,740 | Phelps | Dec. 25, 1934 |
| 2,090,615 | Dodge | Aug. 24, 1937 |
| 2,098,020 | Wheeler | Nov. 2, 1937 |
| 2,284,517 | Fink | May 26, 1942 |
| 2,287,968 | Broulhiet | June 30, 1942 |
| 2,330,778 | Elliot | Sept. 28, 1943 |

FOREIGN PATENTS

| Number | Country | Date |
| --- | --- | --- |
| 647,101 | Germany | June 28, 1937 |